Aug. 15, 1944.  W. J. DRUCKER  2,356,037
MICROMETER TOLERANCE INDICATOR
Filed Sept. 22, 1942
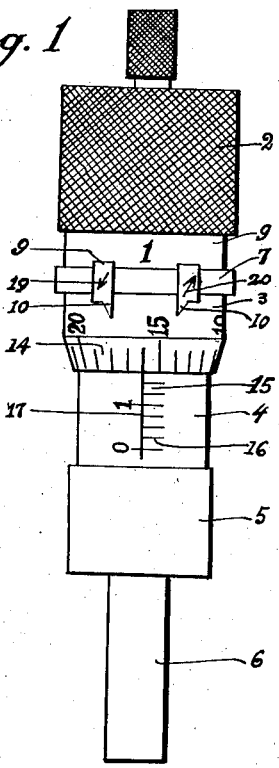
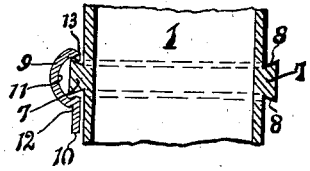
*William J. Drucker*
INVENTOR Patented Aug. 15, 1944

2,356,037

UNITED STATES PATENT OFFICE 2,356,037

MICROMETER TOLERANCE INDICATOR

William J. Drucker, Richmond Hill, N. Y.

Application September 22, 1942, Serial No. 459,265

1 Claim. (Cl. 33—166)

This invention relates to micrometrical instruments such as micrometer calipers, depth gages and such precision measuring devices which are used in combination with a micrometer head.

The object of the invention is an improvement in the reading of the graduations with respect to the tolerance allowed for a given dimension or diameter. This is of special convenience in instances of quantity production, where many parts with a repeating dimension or diameter have to be checked.

I provide means for a tolerance indication which at a glance shows the range limit of graduations comprising the actual dimension or diameter in addition to the tolerance of the upper and the lower limit. The tolerance indication means are so arranged that the graduations are at all times unobstructed and measurements such as tolerance limitations and those outside of same are readable, to ascertain the extent of prevailing errors, if any. Tolerance indicator clips, according to this invention, can be readily removed for readings without tolerance consideration or when repeated checking of a given dimension is not wanted. The particular concentration of mind and sight for the reading of the crowded and fine lined graduations on the thimble and barrel of a micrometer head is lessened by these means, eye strain is eased, a correct and quick reading is facilitated, and errors in reading are reduced to a minimum.

A more complete disclosure of my invention is contained in the following description, together with the accompanying drawing to which reference is made.

In the drawing:

Fig. 1 shows a front elevation of a micrometer head with an embodiment of the invention on the thimble.

Fig. 2 shows a portion of a micrometer thimble depicting the principal details of the invention in cross section.

In Fig. 1 the revolvable micrometer thimble 1 has the conventional knurled portion 2 and below that the indicator portion 3 with the lower beveled edge of the thimble. This beveled edge is spaced with graduated sections as at 14, each section denoting .001". These graduated sections are on a plan horizontal to the graduations 16 on the stationary barrel 4 of the micrometer head. The barrel 4 bears the graduated sections 15 arranged vertically one above the other against the vertical zero line 17. Each of said sections are denoting .025".

The lower portion 5 of the micrometer barrel usually serves as a means of attachment of conjunctional devices for the completion of the various kinds of precision instruments for which micrometer heads are the principal units. The spindle 6 is conventionally so arranged, that it passes axially through the barrel center (not shown) and further up it is threaded, forming the micrometer screw. The spindle is held integrally in the upper portion of the thimble and revolves therewith.

My invention comprises the addition to the micrometer thimble of an endless narrow flange or rim 7, surrounding the thimble. The upper and lower side of this flange are dove tailed in section, extending outwardly as at 8, Fig. 1. This construction is for the purpose of holding two clips 9, with their lower end formed into an indicator point 10. A tension is imparted to the rounded portion 11 (Fig. 2) of the indicator clip 9, which tension exerts itself upon the clawlike portions 12 and 13 of clip 9, engaging the dove tailed sides 8 of the ring or flange 7, thereby completing a firm attachment of both parts, however permitting a sliding advance of clip 9 to any position upon said flange and about said thimble. A slight pressure will suffice to attach the clip 9 to the flange 7.

The face of the left clip 9 is provided with an arrow 19 pointing to left downward, the thimble rotation for diminishing size, and the face of the right clip is provided with an arrow 20 pointing to right upward, the thimble rotation for increasing size.

In practical use the indicator points are spaced so that they indicate the tolerance. For instance Fig. 1 shows a dimension or diameter of .191" micrometer reading. The left indicator point is set pointing at .002" upper limit and the right indicator point is set pointing at .002" lower limit, comprising in this instance a tolerance of .004". As it is not possible in production to exactly hold a given dimension or diameter, the actual one (in this instance .191") may vary as much as .002" above or below. This condition is quickly ascertained with these improvements at hand. Even a variation above or below the indicated tolerance is readily pointed out. In production practice the variations, if not within, are usually close to the tolerance.

As the position of indicator points 10 can be changed to embrace a larger or smaller tolerance, all average tolerance requirements can thus be indicated.

The attachment of the thimble flange or rim formation 7 may be accomplished either integrally with the thimble or detachably upon same the detailed structural holding means for the indicator clip upon the flange or rim may vary.

Having thus described my invention, I claim:

A tolerance indicating micrometer with a thimble surrounded by an affixed flange of a narrow rim shape, adjacent to and above the measurement graduations, the flange having receiving surfaces proffering co-acting holding means to firmly seat and hold tolerance indication clips, and clips manually attachable to and detachable from the flange, also manually movable to any position of the perimeter part of same, said clips having open clasp portions whose structure comprises yielding members engaging the receiving surfaces of the flange, a pointed portion integrally affixed to the clamp portion, serving as part of an indication means of the tolerance in relation to the measurement graduations, and a turn direction arrow applied to the outer surface of said clip.

WILLIAM J. DRUCKER.